United States Patent
Chisu et al.

(10) Patent No.: US 11,048,470 B2
(45) Date of Patent: Jun. 29, 2021

(54) AUDIBLE DISPLAY READOUT BASED ON LIGHTING CONDITIONS

(71) Applicant: Motorola Mobility LLC, Chicago, IL (US)

(72) Inventors: Daniel C. Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/565,466

(22) Filed: Sep. 9, 2019

(65) Prior Publication Data

US 2021/0072949 A1    Mar. 11, 2021

(51) Int. Cl.
| | |
|---|---|
| *G06F 3/16* | (2006.01) |
| *G06F 3/0484* | (2013.01) |
| *H04N 21/439* | (2011.01) |
| *H04N 5/235* | (2006.01) |
| *G06F 3/0489* | (2013.01) |

(52) U.S. Cl.
CPC ............ *G06F 3/165* (2013.01); *G06F 3/0484* (2013.01); *G06F 3/04897* (2013.01); *G06F 3/167* (2013.01); *H04N 5/2354* (2013.01); *H04N 21/4394* (2013.01)

(58) Field of Classification Search
CPC ........ G06F 3/165; G06F 3/167; G06F 3/0484; G06F 3/04897; H04N 5/2354; H04N 21/4394
See application file for complete search history.

(56) References Cited

U.S. PATENT DOCUMENTS

| | | | |
|---|---|---|---|
| 10,139,906 B1* | 11/2018 | Bai | ..................... G06F 3/03547 |
| 10,228,899 B2 | 3/2019 | Chisu et al. | |
| 10,510,266 B1* | 12/2019 | Huynh | ..................... G06F 3/167 |
| 2011/0179355 A1* | 7/2011 | Karlsson | ............... G06F 3/0237 |
| | | | 715/702 |
| 2015/0029087 A1* | 1/2015 | Klappert | ............ H04N 21/4852 |
| | | | 345/156 |

(Continued)

OTHER PUBLICATIONS

"Create and Manage Notification Channels", Retrieved at: https://developer.android.com/training/notify-user/channels—on Aug. 14, 2019, 10 pages.

(Continued)

*Primary Examiner* — Seth A Silverman
(74) *Attorney, Agent, or Firm* — FIG. 1 Patents

(57) ABSTRACT

A device predicts when a user will have difficulty seeing user interface elements displayed on a display due to bright lighting conditions. In response to predicting that a user will have difficulty seeing user interface elements displayed on the display due to bright lighting conditions, the device changes a display theme for the user interface elements to a visually improved display theme. Furthermore, the device audibly plays back, via a device speaker, a readout of the user interface elements displayed on the display. The readout is an audible reading or description of the user interface elements displayed on the display. The device also optionally communicates with an additional device (e.g., a smartwatch or other wearable devices) connected to the device to cause the additional devices to also audibly play back, via a speaker of the additional device, the readout of the user interface elements displayed on the display.

20 Claims, 6 Drawing Sheets

(56) References Cited

U.S. PATENT DOCUMENTS

2016/0211931 A1* 7/2016 Takahashi .............. H04H 20/59
2016/0306533 A1* 10/2016 Agarwal .................. G09G 5/00

OTHER PUBLICATIONS

"F.lux", Retrieved at: https://justgetflux.com/—on Aug. 14, 2019, 2 pages.
"CF.lumen", Retrieved at: https://play.google.com/store/apps/details?id=eu.chainfire.lumen&hl=en_US—on Aug. 14, 2019, 3 pages.
"Fundamentals of Light-Aware User Interfaces", Retrieved at: https://docs.microsoft.com/en-us/windows/win32/sensorsapi/fundamentals-of-light-aware-user-interfaces, May 30, 2018, 4 pages.
Burns,"Moto 360 Sport Review Part II: what no other device has", Retrieved at: https://www.slashgear.com/moto-360-sport-review-part-ii-what-no-other-device-has-17419005/, Dec. 17, 2015, 8 pages.
Martonik,"Emergency alerts and Android: What you need to know", Retrieved at: https://www.androidcentral.com/amber-alerts-and-android-what-you-need-know, Oct. 3, 2018, 9 pages.
Pavlov,"Watch vibration during phone ringing", Retrieved at: https://support.google.com/wearos/thread/33021?hl=en—on Aug. 14, 2019, 2 pages.
Rubino,"How to disable adaptive contrast on the Surface Pro and Surface Book", Retrieved at: https://www.windowscentral.com/how-disable-adapative-contrast-surface, 030/6/2018, 11 pages.

* cited by examiner

AUDIBLE DISPLAY READOUT BASED ON LIGHTING CONDITIONS

BACKGROUND

Computing devices have become commonplace in our lives, with many people carrying mobile phones or other devices with them throughout the day. While these devices are useful, they are not without their problems. One such problem is that seeing text or other user interface elements can be difficult in bright lighting conditions. This can be problematic for the user, such as situations in which the user is outside in bright sunlight, because the user may not be able to see what is displayed on his or her device. These can be frustrating experiences for the user, resulting in user frustration and dissatisfaction with their devices.

BRIEF DESCRIPTION OF THE DRAWINGS

Embodiments of audible display readout based on lighting conditions are described with reference to the following drawings. The same numbers are used throughout the drawings to reference like features and components.

DETAILED DESCRIPTION

Figure 1:
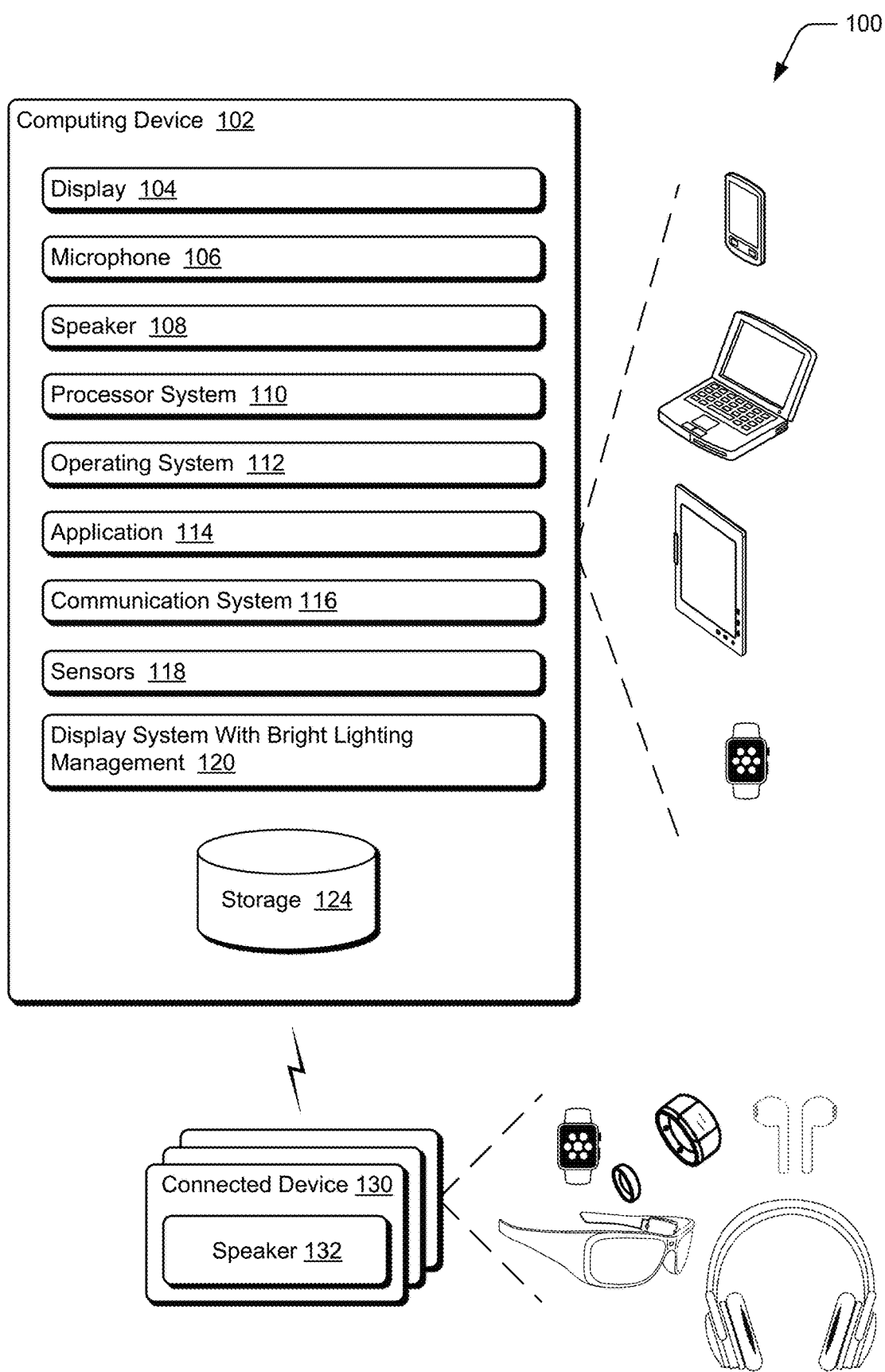
FIG. 1 illustrates an example system implementing the techniques discussed herein.

Audible display readout based on lighting conditions is discussed herein. Generally, a computing device includes a display via which a user interface is displayed. This user interface can include various elements, such as text, icons, images, and so forth. The computing device predicts when a user will have difficulty seeing user interface elements displayed on the display due to bright lighting conditions. In response to predicting that a user will have difficulty seeing user interface elements displayed on the display due to bright lighting conditions, the computing device automatically changes a display theme for the user interface elements from an initial display theme to a visually improved display theme. Furthermore, in response to predicting that a user will have difficulty seeing user interface elements displayed on the display due to bright lighting conditions, the computing device automatically audibly plays back, via a speaker of the computing device, a readout of the user interface elements displayed on the display. The readout is an audible reading or description of the user interface elements displayed on the display. The readout includes, for example, a readout of characters (e.g., text or numbers) displayed on the display, the structure of the user interface elements (e.g., buttons, "cancel" options) displayed on the display, and so forth.

The computing device also optionally communicates with one or more additional devices (e.g., a smartwatch, headphones or earbuds, other wearable devices) connected to the computing device to cause each of those additional devices to also audibly play back, via a speaker of the additional device, the readout of the user interface elements displayed on the display. As such, the possibility of the user missing the information displayed on the display is significantly reduced.

The various embodiments described herein improve upon the state of the art by, in response to predicting that a user will have difficulty seeing user interface elements displayed on the display due to bright lighting conditions, doing one or both of automatically audibly playing back a readout of user interface elements and changing a display theme for the user interface elements to a visually improved display theme. This change in display theme and readout playback allows important information, such as a message regarding an emergency or an incoming voice call, to be communicated to the user despite the user's difficulty in seeing the user interface elements due to the bright lighting conditions. Furthermore, the readout of the user interface elements can audibly be played back at multiple additional devices connected to the device displaying the user interface elements, thus further reducing the possibility of the user missing the information in the displayed user interface elements.

The techniques discussed herein thus improve the user experience with their devices because the users are better able to see the user interface elements due to the visually improved display theme and are audibly made aware of user interface elements despite being in bright lighting conditions and having difficulty seeing user interface elements displayed on the display.

FIG. 1 illustrates an example system 100 implementing the techniques discussed herein. The system 100 includes a computing device 102, which can be many different types of computing or electronic devices. For example, the computing device 102 can be a smartphone or other wireless phone, a notebook computer (e.g., netbook or ultrabook), a laptop computer, a wearable device (e.g., a smartwatch, augmented reality headsets or glasses, virtual reality headsets or glasses), a tablet or phablet computer, an Internet of Things (IoT) device, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores or multiple processors (each having one or more cores).

The computing device 102 also includes an operating system 112. The operating system 112 manages hardware, software, and firmware resources in the computing device 102. The operating system 112 manages one or more applications 114 running on the computing device 102 and operates as an interface between applications 114 and hardware components of the computing device 102.

The computing device 102 also includes a communication system 116. The communication system manages communication with various other devices, including establishing voice calls with other devices, messaging with other devices, and so forth. This communication can take various forms, such as voice calls (e.g., over a cellular system, a public switched telephone network (PSTN), a network (e.g., using voice over Internet Protocol (VoIP), etc.), short messaging service (SMS) messages, multimedia messaging service (MMS) messages, and so forth.

The computing device 102 also includes one or more sensors 118. A variety of different types of sensors 118 can be included in the computing device 102, such as a light sensor, a thermal sensor, a proximity sensor, an image capture device (e.g., a camera), an active IR sensor, a passive IR sensor, a fingerprint sensor, and so forth.

The computing device 102 also includes a display system with bright lighting management 120. The display system with bright lighting management 120 operates to select a display theme for the user interface displayed on the display 104. The display theme refers to settings for the user interface that control brightness, colors, contrast, and so forth. The display system with bright lighting management 120 changes the display theme for the user interface displayed on the display 104 to change based on whether a user is predicted to have difficulty seeing user interface elements displayed on the display due to bright lighting conditions as discussed in more detail below.

Additionally or alternatively, in response to predicting that a user will have difficulty seeing user interface elements displayed on the display due to bright lighting conditions, the display system with bright lighting management 120 audibly plays back, via the speaker 108, a readout of the user interface elements displayed on the display 104, thereby significantly reducing the possibility of the user missing the information displayed on the display 104. The display system with bright lighting management 120 also optionally communicates with one or more additional devices (e.g., a smartwatch, headphones or earbuds, other wearable devices) connected to the computing device 102 to cause those additional devices to also audibly play back, via a speaker of the additional device, the readout of the user interface elements displayed on the display 104. As such, the possibility of the user missing the information displayed on the display device is further significantly reduced.

The display system with bright lighting management 120 can be implemented in a variety of different manners. For example, the display system with bright lighting management 120 can be implemented as multiple instructions stored on computer-readable storage media and that can be executed by the processor system 110. Additionally or alternatively, the display system with bright lighting management 120 can be implemented at least in part in hardware (e.g., as an application-specific integrated circuit (ASIC), a field-programmable gate array (FPGA), and so forth).

The computing device 102 also includes a storage device 124. The storage device 124 can be implemented using any of a variety of storage technologies, such as magnetic disk, optical disc, Flash or other solid state memory, and so forth. The storage device 124 can store various program instructions and data for the operating system 112, application 114, communication system 118, display system 120, or bright lighting management system 122.

The system 100 also includes one or more connected devices 130. Each connected device 130 can itself be any of a variety of computing devices, or any of a variety of devices that provide input to the computing device 102 or receive output from the computing device 102. For example, a connected device 130 can be a wearable device (e.g., a smartwatch, augmented reality headsets or glasses, virtual reality headsets or glasses, jewelry, headphones or earbuds), an Internet of Things (IoT) device, a fitness tracker, and so forth. Each connected device 130 is connected to the computing device 102, and can be, but need not be, connected to each other. Each connected device 130 is connected to the computing device 102 (or another connected device 130) via any of a variety of wired (e.g., USB, IEEE 1394, HDMI) or wireless (e.g., Wi-Fi, Bluetooth, IR) connections. Each connected device 130 also includes a speaker 132 that operates to play back audio data at the connected device 130. This audio data optionally includes the readout of the user interface elements displayed on the display 104. Each speaker 132 can be configured as any suitable type of speaker incorporating a transducer that converts an electrical signal into sound, analogous to the speaker 108.

Figure 2:
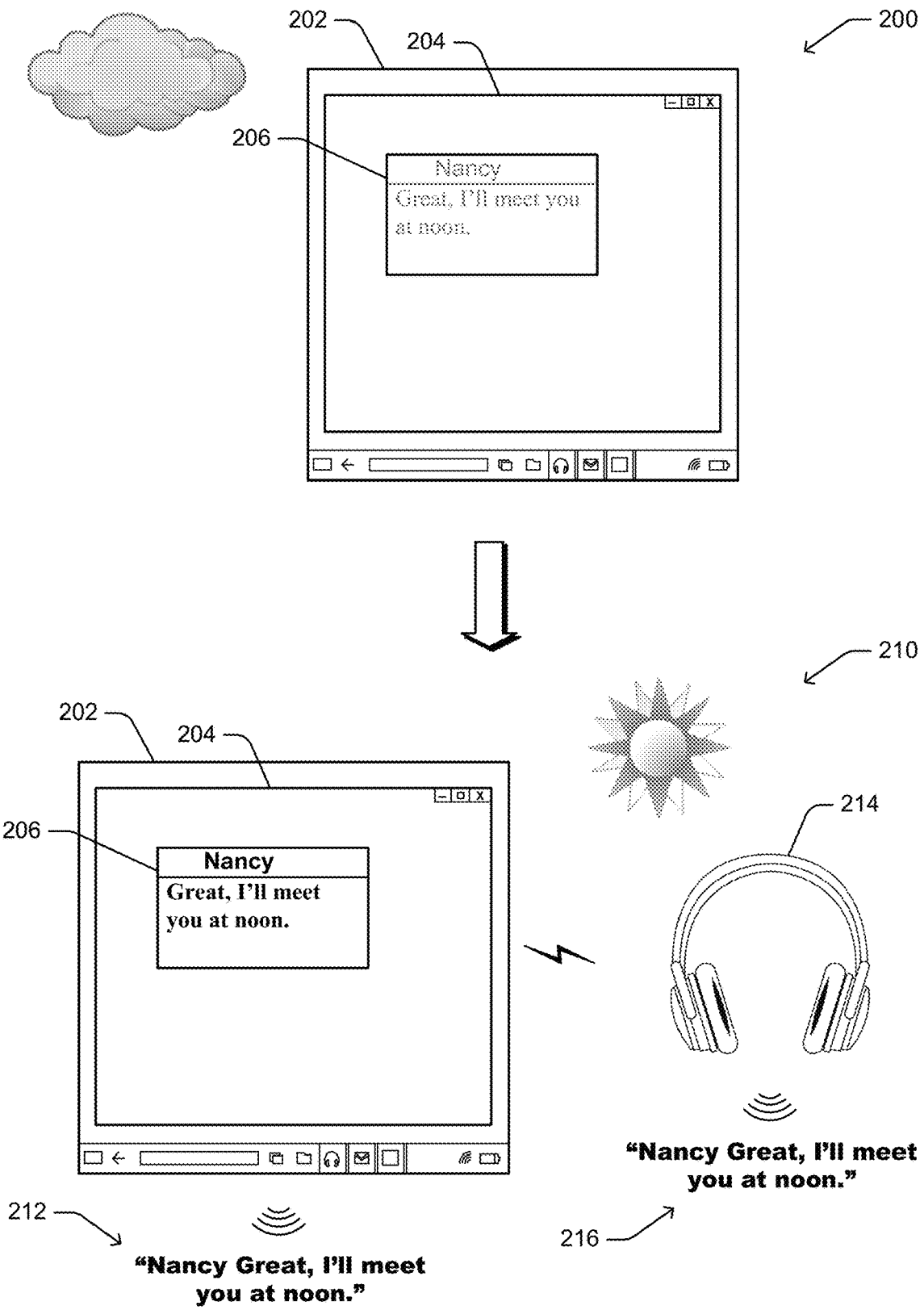
FIG. 2 illustrates an example of the use of the techniques discussed herein.

FIG. 2 illustrates an example of the use of the techniques discussed herein. In the illustrated example, at 200 a computing device 202 includes an application in the form of a communication system that displays a user interface 204 on a display. The user interface 204 displays a text message "Great, I'll meet you at noon" from a contact named "Nancy". As shown at 200 the computing device 202 is in a cloudy environment and so the user is not predicted to have difficulty seeing elements displayed as part of the user interface 204 due to bright lighting conditions at the computing device. Accordingly, a normal or default display theme is used to display user interface elements, and a readout of the user interface elements is not audibly played back at 200.

However, at 210 the computing device 202 is in a sunny environment (e.g., the user moved the computing device 202 or the clouds went away) and so the user is predicted to have difficulty seeing elements displayed as part of the user interface 204 due to bright lighting conditions at the computing device 202. Accordingly, a visually improved display theme is used to display user interface elements, such as a display theme with a higher brightness setting, text in a different color, and so forth. Furthermore, a readout of the user interface elements is audibly played back 212 at the computing device 202. The readout of the user interface elements is also communicated to an additional device connected to the computing device 202, illustrated as headphones 214, and is audibly played back 216 at the headphones 214.

With the use of the visually improved display theme and the readout of the text message being audibly played back, the possibility of the user missing the content of the text message is significantly reduced.

Figure 3:
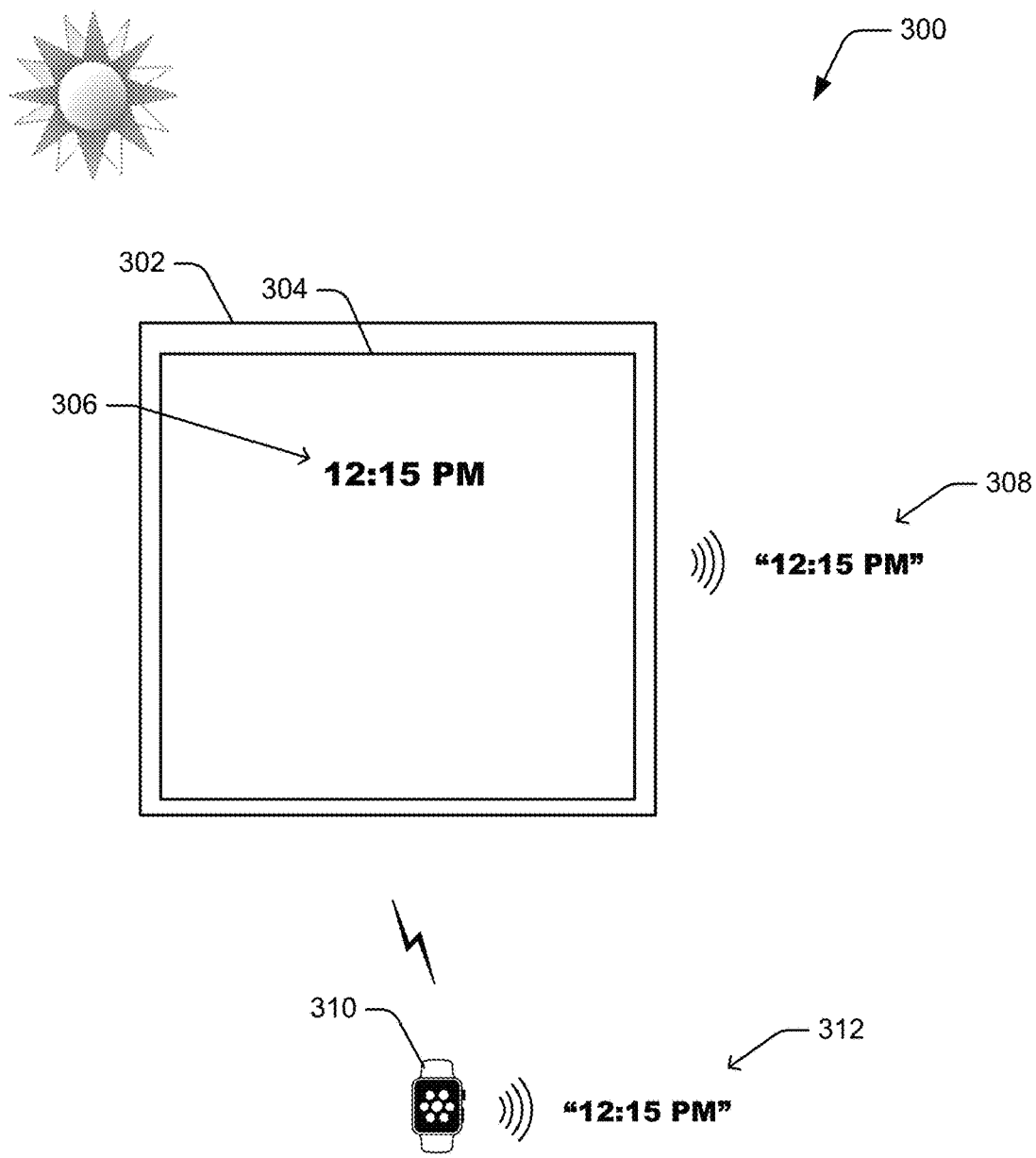
FIG. 3 illustrates another example of the use of the techniques discussed herein.

FIG. 3 illustrates another example of the use of the techniques discussed herein. In the illustrated example, at 300 a computing device 302 includes a program that displays a time on a user interface 304 of a display. The program can display the time in response to various different actions, such as the computing device 302 sensing a person close to the computing device 302, the computing device sensing a user waving his or her hand over the display of the computing device 302, and so forth. In the illustrated example 300, at 306 the program displays a current time of 12:15 PM.

As shown, the computing device 302 is in a sunny environment so the user is predicted to have difficulty seeing elements displayed as part of the user interface 304 due to bright lighting conditions at the computing device 302. Accordingly, a visually improved display theme is used to display user interface elements, such as a display theme with a higher brightness setting, text in a different color, and so forth. Furthermore, a readout of the user interface elements is audibly played back 308 at the computing device 302. The readout of the user interface elements is also communicated to an additional device connected to the computing device 302, illustrated as a smartwatch 310, and the user interface elements are audibly played back 312 by the headphones 310.

With the use of the visually improved display theme and the readout of the current time being audibly played back, the possibility of the user missing the current time is significantly reduced.

Figure 4:
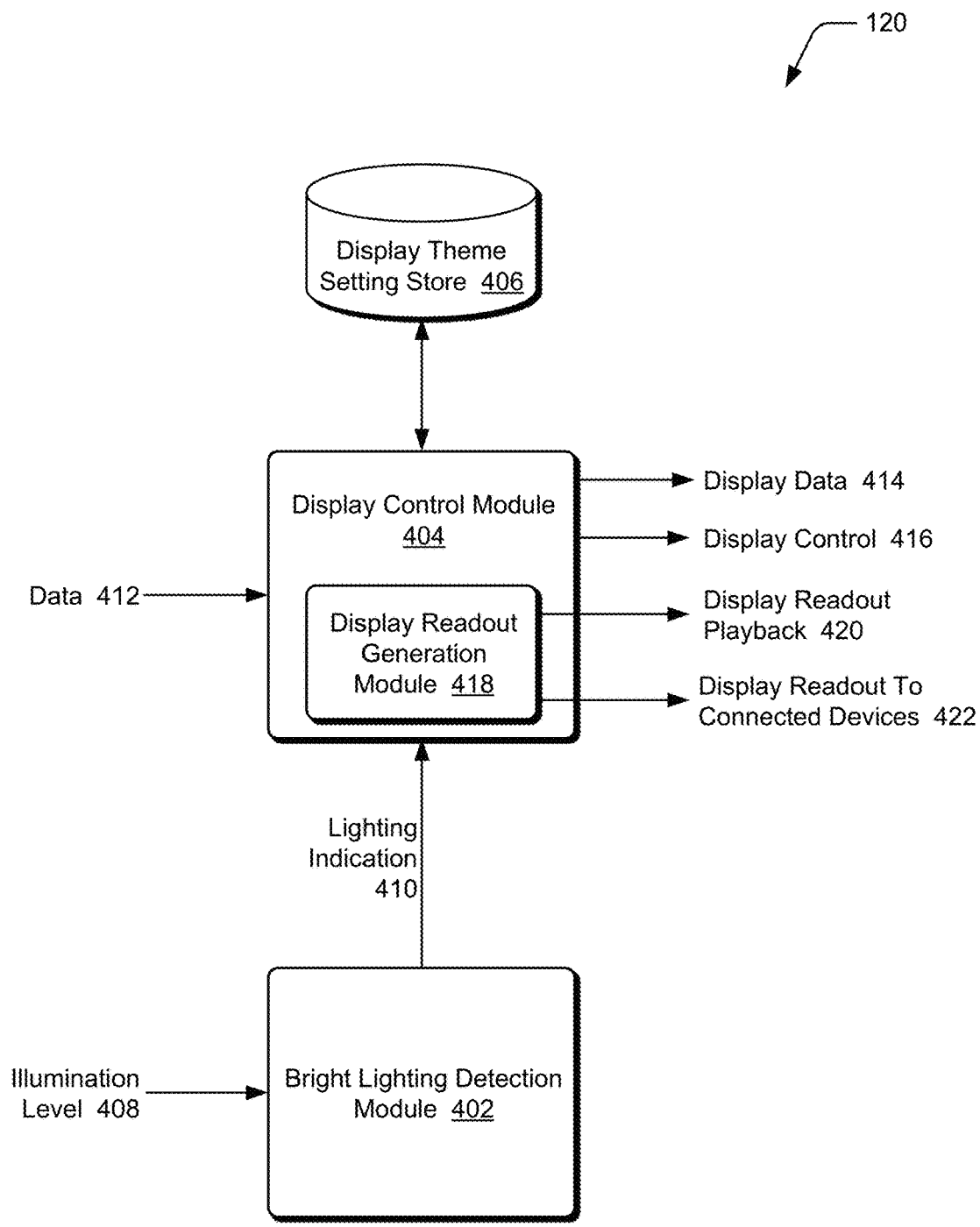
FIG. 4 illustrates an example architecture of the display system with bright lighting management.

FIG. 4 illustrates an example architecture of the display system with bright lighting management 120. The display system with bright lighting management 120 includes a bright lighting detection module 402, a display control module 404, and a display theme setting store 406. Generally, the bright lighting detection module 402 receives an illumination level indicating the lighting conditions at the computing device 102 and predicts whether a user will have difficulty seeing user interface elements displayed on the display 104 of the computing device 102 due to bright lighting conditions at the computing device 102. An indication of whether a user is predicted to have difficulty seeing user interface elements displayed on the display 104 due to bright lighting conditions at the computing device 102, also referred to as a lighting indication 410, is provided to the display control module 404. The display control module 404 receives data 412 from a program for display on the display 104 and uses the lighting indication to determine a display theme to use in displaying the data 412 and whether to audibly playback a readout of the display 104.

The bright lighting detection module 402 receives an illumination level 408 from a light sensor, such as one of the sensors 118. In one or more embodiments, the light sensor is situated on the same face of the computing device 102 as the display 104, allowing the light sensor to sense light that is being received at the display 104. The light sensor can be any type of sensor capable of sensing light, such as a photoresistor, a photodiode, a phototransistor, and so forth. The illumination level 408 is an indication of the lighting conditions at the computing device 102 and is quantified in, for example, lux.

In one or more embodiments, the bright lighting detection module 402 predicts or determines whether a user will have difficulty seeing user interface elements displayed on the display 104 of the computing device 102 due to bright lighting conditions at the computing device 102 by comparing the illumination level 408 to a threshold level of illumination. The bright lighting detection module 402 predicts or determines that a user will have difficulty seeing user interface elements displayed on the display 104 due to bright lighting conditions at the computing device 102 in response to the illumination level 408 satisfying (e.g., meeting or exceeding) the threshold level of illumination, and that a user will not have difficulty seeing user interface elements displayed on the display 104 of the computing device 102 due to bright lighting conditions at the computing device 102 in response to the illumination level 408 not satisfying (e.g., not meeting or not exceeding) the threshold level of illumination.

The bright lighting detection module 402 is made aware of a threshold level of illumination that, when satisfied, indicates that the lighting conditions are likely bright enough to inhibit a user's ability to see user interface elements displayed on the display 104. In one or more embodiments, the threshold level of illumination is specified by a manufacturer of the computing device 102. Alternatively or additionally, the threshold level of illumination is specified by the user of the computing device 102. In one or more embodiments, the bright lighting detection module 402 may periodically prompt the user for feedback regarding whether the user is able to see user interface elements on the display 104. In this manner, the bright lighting detection module 402 can record user feedback and adjust the threshold level of illumination to account for different user preferences or abilities.

Although a threshold level of illumination is discussed, it should be noted that the bright lighting detection module 402 can additionally or alternatively predict whether a user will have difficulty seeing user interface elements displayed on the display 104 due to bright lighting conditions at the computing device 102 in other manners. For example, various different rules or criteria can be applied to the illumination level 408 to predict or determine whether a user will have difficulty seeing user interface elements displayed on the display 104 due to bright lighting conditions at the computing device 102. By way of another example, a machine learning system can be trained on the illumination level to predict or determine whether a user will have difficulty seeing user interface elements displayed on the display 104 due to bright lighting conditions at the computing device 102.

The bright lighting detection module 402 communicates the lighting indication 410 to the display control module 404 indicating whether the user will have difficulty seeing user interface elements displayed on the display 104.

In one or more embodiments, the bright lighting detection module 402 determines whether a user will have difficulty seeing user interface elements displayed on the display 104 due to bright lighting conditions at the computing device 102 in response to data 412 being received by the display control module 404. The data 412 refers to data to be displayed on the display 104, which can be received from various different sources (e.g., another system, application, hardware component, and so forth of the computing device 102).

In response to receiving the data 412, the display control module 404 issues a request to the bright lighting detection module 402 for a prediction of whether a user will have difficulty seeing user interface elements displayed on the display 104 due to bright lighting conditions at the computing device 102. In response, the bright lighting detection module 402 predicts or determines whether a user will have difficulty seeing user interface elements displayed on the display 104 due to bright lighting conditions at the computing device 102 and provides an indication of such to the display control module 404 as lighting indication 410. Additionally or alternatively, the display control module 404 can issue the request to the bright lighting detection module 402 for a prediction of whether a user will have difficulty seeing user interface elements displayed on the display 104 due to bright lighting conditions at the computing device 102 in response to other events, such as being notified of an incoming call, being notified of a user request to activate the display 104 or display one or more user interface elements (e.g., the user waving his or her hand over the display 104), and so forth.

By predicting whether a user will have difficulty seeing user interface elements displayed on the display 104 due to bright lighting conditions at the computing device 102 in response to a request from the display control module 404 can conserve computing device resources. For example, the bright lighting detection module 402 need not expend power continually monitoring lighting conditions at the computing device 102 and predicting whether a user will have difficulty seeing user interface elements displayed on the display 104 due to bright lighting conditions at the computing device 102 when there is no data being displayed on the display 104.

Additionally or alternatively, the bright lighting detection module 402 can continually monitor lighting conditions at the computing device 102 and predict whether a user will have difficulty seeing user interface elements displayed on the display 104 due to bright lighting conditions at the computing device 102. This monitoring and predicting can be performed at regular or irregular intervals, such as approximately every 15 seconds. In one or more embodiments, the bright lighting detection module 402 communicates the lighting indication 410 to the display control module 404 indicating whether a user will have difficulty seeing user interface elements displayed on the display 104 due to bright lighting conditions at the computing device 102 in response to each prediction. Additionally or alternatively, the bright lighting detection module 402 can communicate the lighting indication 410 to the display control module 404 only in response to a change in the lighting indication 410 (e.g., the user is predicted to have difficulty seeing user interface elements but the previous prediction was that the user would not have difficulty seeing user interface elements, or the user is predicted to not have difficulty seeing user interface elements but the previous prediction was that the user would have difficulty seeing user interface elements).

By continually predicting whether a user will have difficulty seeing user interface elements displayed on the display 104 due to bright lighting conditions at the computing device 102 the display control module 404 is ready to change the display theme and generate a readout of the display 104. Time need not be expended in determining the display theme to use or activating logic to generate the readout thereby allowing the data to be displayed and the readout to be audibly played back more quickly.

The display control module 404 receives data 412 from a program for display on the display 104 and uses the lighting indication 410 to determine a display theme to use in displaying the data 412 and whether to audibly playback a readout of the display 104. The settings for multiple display themes are maintained in the display theme setting store 406. Each display theme can include settings for various different parameters, such as colors to use (e.g., for background and text), contrast settings for the display 104, color contrast settings, brightness settings for the display 104, and so forth.

In response to the lighting indication 410 indicating that the user will not have difficulty seeing user interface elements displayed on the display 104 due to bright lighting conditions at the computing device 102, the display control module 404 uses a current display theme for outputting the data 412. The current display theme can be, for example, the display theme that was most recently used to display data, a default display theme, a user-specified display theme, a display theme selected based on time of day, and so forth. The display control module 404 outputs display data 414, which is the data 412 to which the current display theme has been applied (which optionally changes colors of characters in the data 412). The display control module 404 also outputs display control 416 to the display 104, which is a signal indicating one or more settings (e.g., brightness settings, contrast settings) for the display 104. Optionally, the display control 406 is only sent in response to a change in the display theme. If the current display theme is the same as the previously used display theme, then the display 104 will remain at the same settings (e.g., brightness settings, contrast settings).

In response to the lighting indication 410 indicating that the user will have difficulty seeing user interface elements displayed on the display 104 due to bright lighting conditions at the computing device 102, the display control module 404 uses a visually improved display theme for outputting the data 412. The visually improved display theme is a display theme having parameter settings to improve the visibility of user interface elements on the display 104 in the bright lighting conditions. Various different parameter settings can be used, such as setting the brightness of the display to a high or maximum value, using monochrome colors, using color pairs that are opposite hues (e.g., yellow for the background and blue for text characters), and so forth.

The display control module 404 outputs display data 414, which is the data 412 to which the visually improved display theme has been applied. The display control module 404 also outputs display control 416, which is a signal indicating one or more settings (e.g., brightness settings, contrast settings) for the display 104. As discussed above, optionally the display control 406 is only sent in response to a change in the display theme. If the current display theme is the same as the previously used display theme, then the display 104 will remain at the same settings (e.g., brightness settings, contrast settings).

In one or more embodiments, the display control module 404 includes a display readout generation module 418. In response to the lighting indication 410 indicating that the user will have difficulty seeing user interface elements displayed on the display 104 due to bright lighting conditions at the computing device 102, the display readout generation module 418 generates a readout of the user interface elements displayed on the display 104. This readout is then audibly played back via the speaker 108. The readout includes, for example, a readout of characters (e.g., text or numbers) displayed on the display 104, the structure of the user interface elements (e.g., buttons, "cancel" options) displayed on the display 104, and so forth.

The display readout generation module 418 can generate the readout in any of a variety of different manners. In one or more embodiments, the display control module 404 receives an indication of the user interface elements from the program or other source that provides the data 412. This indication can be, for example, an audio description of the user interface elements that the data 412 describes, and this audio description is the readout. Additionally or alternatively, this indication can be a text description of the user interface elements that the data 412 describes. The display readout generation module 418 can then use any of a variety of public or proprietary text-to-speech techniques to generate audio from the text description, the generated audio being the readout.

Additionally or alternatively, the display readout generation module 418 can access one or more other programs on the computing device 102 (e.g., programs that are part of the communication system 116) to determine the user interface elements being displayed. For example, if an incoming voice call is received and caller ID information is displayed (e.g., the name and number of the caller), then one or more programs that are part of the communication system 116 communication stack have the caller ID information and the display readout generation module 418 accesses (e.g., sends a request to) those one or more programs to obtain the caller ID information. The display readout generation module 418 can then use any of a variety of public or proprietary text-to-speech techniques to generate audio from the caller ID information, the generated audio being the readout.

Additionally or alternatively, the display system bright lighting management 120 can include one or more programs that scan the contents of what is being displayed on the display 104. This scan can be performed, for example, by accessing a frame buffer of the computing device 102. The display readout generation module 418 access (e.g., sends a request to) those one or more programs and receives the scan of the contents of what is being displayed on the display 104. The display readout generation module 418 can then use any of a variety of public or proprietary optical character recognition techniques to generate text from the scan, and use any of a variety of public or proprietary text-to-speech techniques to generate audio from the generated text, the generated audio being the readout.

Regardless of the manner in which the display readout generation module 418 generates the readout, the display readout generation module 418 plays back 420 the readout via the speaker 108. This generation and audible playback of a readout of the display 104 can be repeated at regular or irregular intervals (e.g., approximately every seconds), in response to various events (e.g., a change in the user interface elements being displayed on the display 104), and so forth.

In one or more embodiments, the display readout generation module 418 communicates the display readout 422 to at least one connected device 130 (and optionally all connected devices 130). The display readout 422 is the same readout as is played back via the speaker 108. The display readout 422 can be communicated in a variety of different manners, such as audio data streamed to the at least one connected device 130, audio data stored in an audio file for playback by the at least one connected device 130, and so forth. Each connected device 130 has a speaker 132 and plays back the display readout 422 at the connected device 130.

In one or more embodiments, the display readout generation module 418 plays back the display readout 420 concurrently with communicating the display readout 422 to at least one connected device 130. Accordingly, the readout is played back via the speaker 108 and at least one speaker 132 approximately concurrently.

Additionally or alternatively, various measures can be taken to prevent the readout from being played back via the speaker 108 and at least one speaker 132 to avoid playback of the readout that is out of synchronization. For example, the display readout generation module 418 can delay communicating the display readout 422 to the at least one connected device 130 until after the display readout 420 has been played back via the speaker 108. The at least one connected device 130 plays back the display readout 422 via the speaker 132 upon receipt, resulting in a readout of the user interface elements being audibly played back multiple time sequentially rather than concurrently. In situations in which there are multiple connected devices 130, the display readout 422 can be communicated to each connected device 130 sequentially, with the display readout 422 not being communicated to a next connected device 130 until after the connected device 130 to which the display readout 422 was previously communicated to has completed audibly playing back the display readout 422.

By way of another example, the display readout generation module 418 can include a time delay with the display readout 422 communicated to each connected device 130 that notifies the connected device how long to wait before audibly playing back the display readout 422. For example, if there are three connected devices and playback of the display readout is expected to take 3 seconds, the display readout generation module 418 can audibly play back the display readout 420 via the speaker 108 and communicate the display readout 422 to a first connected device 130 with a time delay of 3 seconds, communicate the display readout 422 to a second connected device 130 with a time delay of 6 seconds, and communicate the display readout 422 to the third connected device 130 with a time delay of 9 seconds.

By automatically playing back audio describing the text being displayed, at the computing device 102 and optionally at one or more connected devices 130, the possibility of the user missing the information displayed on the display is significantly reduced.

It should be noted that whether the display system with bright lighting management 120 changes a display theme setting or audibly plays back a readout of the user interface elements on the display in response to predicting that the user will have difficulty seeing the user interface can be based on a user preference setting. E.g., user input can be received indicating whether the display system with bright lighting management 120 changes a display theme setting or audibly plays back a readout of the user interface elements on the display in response to predicting that the user will have difficulty seeing the user interface.

Figure 5:
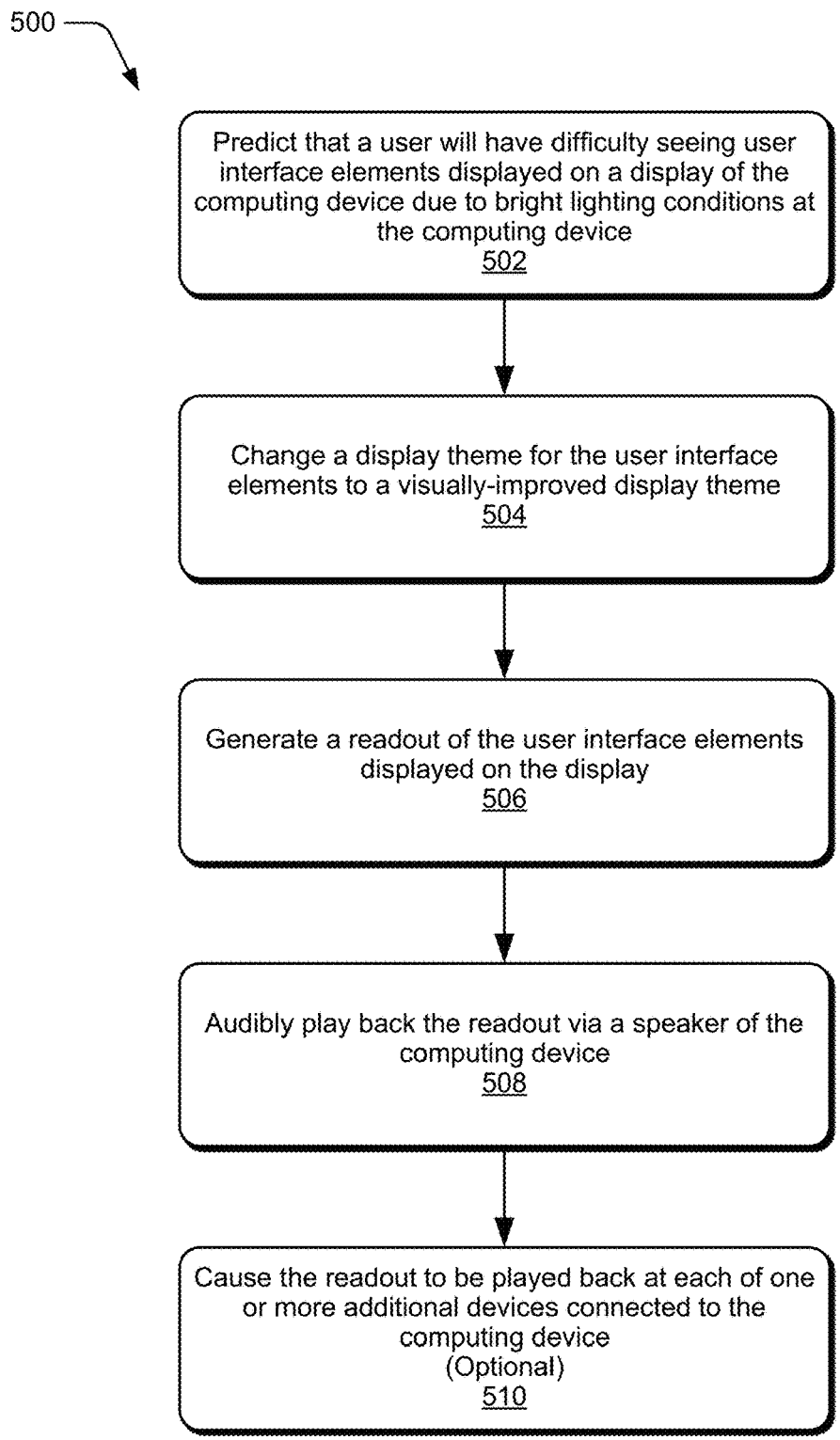
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by a display system with bright lighting management, such as the data backup system 120 of FIG. 1 or FIG. 4, and can be implemented in software, firmware, hardware, or combinations thereof. Process 500 is shown as a set of acts and is not limited to the order shown for performing the operations of the various acts.

In process 500, a prediction is made that a user will have difficulty seeing user interface elements displayed on a display of a computing device due to bright lighting conditions at the computing device (act 502). This prediction can be made in various manners, such as by determining whether an illumination level at the computing device exceeds a threshold level of illumination. This prediction can be made continually or in response to other events, such as receipt of data to be displayed, as discussed above.

In response to predicting that the user will have difficulty seeing the user interface elements, a display theme for the user interface elements is changed from a current display theme to a visually improved display theme (act 504). This visually improved display theme includes various parameters settings to increase the likelihood of the user being able to view the user interface elements displayed on the display as discussed above.

Also in response to predicting that the user will have difficulty seeing the user interface elements, a readout of the user interface elements displayed on the display is generated (act 506). The readout is an audible reading or description of the user interface elements displayed on the display. This generation need not be performed in situations in which an audio description of the user interface elements is received from another program.

The readout of the user interface elements displayed on the display is audibly played back via a speaker of the computing device (act 508). The readout can be audibly played back a single time or at multiple times, such as with a time gap (e.g., 5 or 10 seconds) between each playback.

Furthermore, the readout is caused to be played back at each of one or more additional devices connected to the computing device (act 510). The readout is communicated to one or more additional devices connected to the computing device, each of which audibly plays back the readout via their respective speakers.

It should be noted that all of the acts shown in process 500 need not be performed. For example, acts 506 and 510 may not be performed in certain situations.

Figure 6:
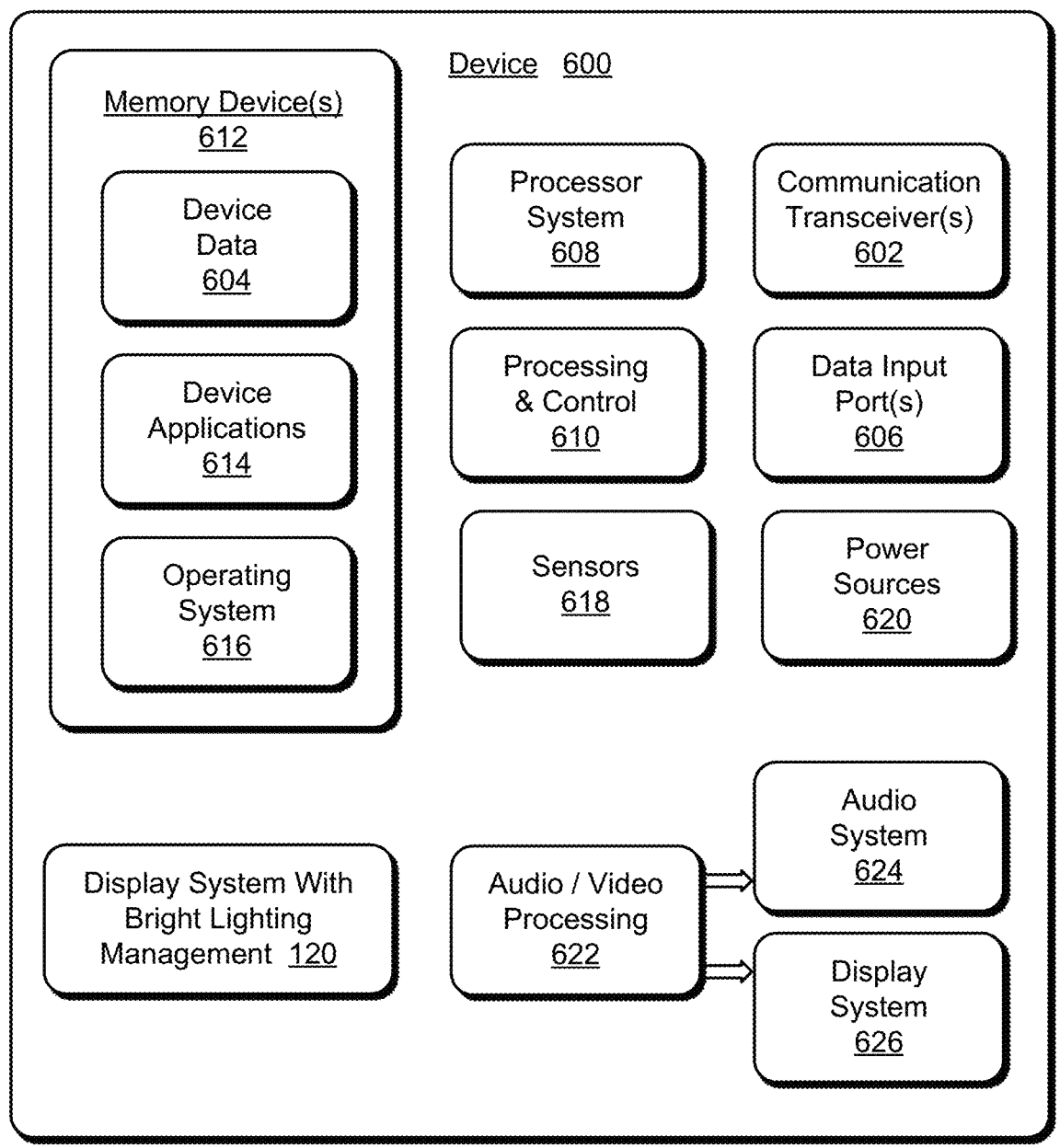
FIG. 6 illustrates various components of an example electronic device in which embodiments of audible display readout based on lighting conditions can be implemented.

FIG. 6 illustrates various components of an example electronic device 600 in which embodiments of audible display readout based on lighting conditions can be implemented. The electronic device 600 can be implemented as any of the devices described with reference to the previous FIG.s, such as any type of client device, mobile phone, tablet, computing, communication, entertainment, gaming, media playback, and/or other type of electronic device. In one or more embodiments the electronic device 600 includes a display system with bright lighting management 120, described above.

The device 600 includes communication transceivers 602 that enable wired and/or wireless communication of device data 604 with other devices. The device data 604 can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system 608 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternately or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory devices 612 that enable data storage, such as data storage devices that can be accessed by a computing device, and that provide persistent storage of data and executable instructions (e.g., software applications, programs, functions, and the like). Examples of the computer-readable storage memory devices 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory device 612 provides data storage mechanisms to store the device data 604, other types of information and/or data, and various device applications 614 (e.g., software applications). For example, an operating system 616 can be maintained as software instructions with a memory device and executed by the processing system 608. Additionally, although illustrated separate from the computer-readable storage memory device 612, the communication system 106 can be maintained as one of device applications 614. The device applications may also include a device manager, such as any form of a control application, software application, signal-processing and control module, code that is native to a particular device, a hardware abstraction layer for a particular device, and so on.

The device 600 can also include one or more device sensors 618, such as any one or more of an ambient light sensor, a proximity sensor, a touch sensor, an infrared (IR) sensor, accelerometer, gyroscope, and the like. The device 600 can also include one or more power sources 620, such as when the device is implemented as a mobile device. The power sources may include a charging and/or power system, and can be implemented as a flexible strip battery, a rechargeable battery, a charged super-capacitor, and/or any other type of active or passive power source.

The device 600 additionally includes an audio and/or video processing system 622 that generates audio data for an audio system 624 and/or generates display data for a display system 626. In accordance with some embodiments, the audio/video processing system 622 is configured to receive call audio data from the communication system 106 and communicate the call audio data to the audio system 624 for playback at the device 600. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In implementations, the audio system and/or the display system are integrated components of the example device. Alternatively, the audio system and/or the display system are external, peripheral components to the example device.

Although the embodiments described above have been described in language specific to features or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described, and it is to be appreciated that each described embodiment can be implemented independently or in connection with one or more other described embodiments. Additional aspects of the techniques, features, and/or methods discussed herein relate to one or more of the following:

A method, comprising: predicting that a user will have difficulty seeing user interface elements displayed on a display of a computing device due to bright lighting conditions at the computing device; and in response to predicting that the user will have difficulty seeing the user interface elements: changing a display theme for the user interface elements from a current display theme to a visually improved display theme; and audibly playing back, via a speaker of the computing device, a readout of the user interface elements displayed on the display.

Alternatively or in addition to the above described method, any one or combination of the following. The predicting that a user will have difficulty seeing the user interface elements comprising determining that an illumination level at the display exceeds a threshold lux level. The method further comprising performing the predicting, changing, and audibly playing back in response to a user request to display one or more user interface elements. The method further comprising repeating the changing and audibly playing back in response to a change in one or more user interface elements displayed on the display. The method further comprising, in response to predicting that the user will have difficulty seeing the user interface elements causing, at each of one or more additional devices connected to the computing device, the readout of the user elements displayed on the display to be audibly played back at the additional device. The method further comprising communicating, in response to predicting that the user will have difficulty seeing the user interface elements, the readout of the user interface elements to each of the one or more additional devices. The method further comprising repeating the causing in response to a change in one or more user interface elements displayed on the display. The method further comprising, in response to predicting that the user will have difficulty seeing the user interface elements causing, at each of one or more additional devices connected to the computing device, the readout of the user elements displayed on the display to be audibly played back at the additional device after the readout is audibly played back via the speaker of the computing device. The one or more additional devices comprising multiple additional devices, and the causing comprising causing the readout of the user elements displayed on the display to be audibly played back sequentially at the multiple additional devices. The method further comprising: predicting that the user will no longer have difficulty seeing the user interface elements due to bright lighting conditions; and in response to predicting that the user will no longer have difficulty seeing the user interface elements: changing the display theme for the user interface elements from the visually improved display theme to the current display theme; and ceasing audibly playing back the user interface elements displayed on the display.

A computing device comprising: a speaker; a light sensor; a display; one or more processors; and one or more computer readable storage media storing computer-readable instructions which, when executed, perform operations including: predicting that a user will have difficulty seeing user interface elements displayed on the display due to bright lighting conditions based on an illumination level detected by the light sensor; and in response to predicting that the user will have difficulty seeing the user interface elements: changing a display theme for the user interface elements from a first display theme to a second display theme, the second display theme having one or more parameter settings to improve the visibility of user interface elements on the display; and audibly playing back, via the speaker, a readout of the user interface elements displayed on the display.

Alternatively or in addition to the above described computing device, any one or combination of the following. The predicting that a user will have difficulty seeing the user interface elements comprising determining that an illumination level at the display exceeds a threshold lux level. The operations further comprising, in response to predicting that the user will have difficulty seeing the user interface elements causing, at each of one or more additional devices connected to the computing device, the readout of the user elements displayed on the display to be audibly played back at the additional device. The operations further comprising communicating, in response to predicting that the user will have difficulty seeing the user interface elements, the readout of the user interface elements to each of the one or more additional devices. The one or more additional devices comprising multiple additional devices, and the causing comprising causing the readout of the user elements displayed on the display to be audibly played back sequentially at the multiple additional devices after the readout is audibly played back via the speaker.

A system comprising: a speaker; a display; a bright lighting detection module to predict that a user will have difficulty seeing user interface elements displayed on the display due to bright lighting conditions at the computing device; and a display control module to, in response to predicting that the user will have difficulty seeing the user interface elements, change a display theme for the user interface elements from a current display theme to a visually improved display theme, and audibly play back, via the speaker, a readout of the user interface elements displayed on the display.

Alternatively or in addition to the above described system, any one or combination of the following. Wherein to predict that a user will have difficulty seeing the user interface elements is to determine that an illumination level at the display exceeds a threshold lux level. Wherein the display control module is further to, in response to predicting that the user will have difficulty seeing the user interface elements cause, at each of one or more additional devices connected to the computing device, the readout of the user elements displayed on the display to be audibly played back at the additional device. Wherein the display control module is further to communicate, in response to predicting that the user will have difficulty seeing the user interface elements, the readout of the user interface elements to each of the one or more additional devices. The one or more additional devices comprising multiple additional devices, and wherein to cause the readout of the user elements displayed on the display to be audibly played back at the additional device is to cause the readout of the user elements displayed on the display to be audibly played back sequentially at the multiple additional devices after the readout is audibly played back via the speaker.

What is claimed is:

1. A method, comprising:
receiving an indication of a lighting level at a computing device;
predicting, in response to the lighting level satisfying a threshold level of illumination, that a user will have difficulty seeing user interface elements displayed on a display of the computing device due to bright lighting conditions at the computing device; and
in response to predicting that the user will have difficulty seeing the user interface elements:
changing a display theme for the user interface elements from a current display theme to a visually improved display theme that has a high brightness setting or uses color pairs that are opposite hues; and
audibly playing back, via a speaker of the computing device, a readout of the user interface elements displayed on the display, the audibly playing back including automatically repeating the readout at regular intervals.

2. The method as recited in claim 1, further comprising performing the predicting, changing, and audibly playing back in response to a user request to display one or more user interface elements.

3. The method as recited in claim 1, further comprising repeating the changing and audibly playing back in response to a change in one or more user interface elements displayed on the display.

4. The method as recited in claim 1, further comprising, in response to predicting that the user will have difficulty seeing the user interface elements causing, at each of one or more additional devices connected to the computing device, the readout of the user elements displayed on the display to be audibly played back at the additional device.

5. The method as recited in claim 4, further comprising communicating, in response to predicting that the user will have difficulty seeing the user interface elements, the readout of the user interface elements to each of the one or more additional devices.

6. The method as recited in claim 4, further comprising repeating the causing in response to a change in one or more user interface elements displayed on the display.

7. The method as recited in claim 1, further comprising, in response to predicting that the user will have difficulty seeing the user interface elements causing, at each of one or more additional devices connected to the computing device, the readout of the user interface elements displayed on the display to be audibly played back at the additional device after the readout is audibly played back via the speaker of the computing device.

8. The method as recited in claim 7, the one or more additional devices comprising multiple additional devices, and the causing comprising causing the readout of the user elements displayed on the display to be audibly played back sequentially at the multiple additional devices.

9. The method as recited in claim 1, further comprising:
predicting, in response to the lighting level no longer satisfying the threshold level of illumination, that the user will no longer have difficulty seeing the user interface elements due to bright lighting conditions; and
in response to predicting that the user will no longer have difficulty seeing the user interface elements:
changing the display theme for the user interface elements from the visually improved display theme to the current display theme; and
ceasing audibly playing back the user interface elements displayed on the display.

10. The method as recited in claim 1, further comprising, in response to predicting that the user will have difficulty seeing the user interface elements causing, at a first additional device of multiple additional devices connected to the computing device, the readout of the user interface elements displayed on the display to be audibly played back at the first additional device after the readout is audibly played back via the speaker of the computing device and after audible playback of the readout by a second additional device of the multiple additional devices has completed.

11. The method as recited in claim 10, the causing the readout of the user interface elements displayed on the display to be audibly played back at the first additional device including not communicating the readout to the first additional device until playback of the readout by the second additional device has completed.

12. A computing device comprising:
a speaker;
a light sensor;
a display;
one or more processors; and
one or more computer readable storage media storing computer-readable instructions which, when executed, perform operations including:
receiving an indication of a lighting level at the computing device detected by the light sensor;
predicting, in response to the lighting level satisfying a threshold level of illumination, that a user will have difficulty seeing user interface elements displayed on the display due to bright lighting conditions at the computing device; and
in response to predicting that the user will have difficulty seeing the user interface elements:
changing a display theme for the user interface elements from a first display theme to a second display theme, the second display theme having one or more parameter settings to improve visibility of user interface elements on the display, the one or more parameter settings including a high brightness setting or a setting to use color pairs that are opposite hues;
audibly playing back, via the speaker, a readout of the user interface elements displayed on the display; and
causing, at a first additional device of multiple additional devices connected to the computing device, the readout of the user interface elements displayed on the display to be audibly played back at the first additional device after the readout is audibly played back via the speaker of the computing device and after audible playback of the readout by a second additional device of the multiple additional devices has completed.

13. The computing device as recited in claim 12, the causing the readout of the user interface elements displayed on the display to be audibly played back at the first additional device including not communicating the readout to the first additional device until playback of the readout by the second additional device has completed.

14. The computing device as recited in claim 12, the causing the readout of the user interface elements displayed on the display to be audibly played back at the first additional device including communicating the readout to the first additional device along with a time delay indicating an amount of time the first additional device is to wait before audibly playing back the readout.

15. The computing device as recited in claim 12, the audibly playing back the readout of the user interface elements displayed on the display including automatically repeating the readout at regular intervals.

16. A system comprising:
    a speaker;
    a display;
    a bright lighting detection module to receive an indication of a lighting level at a computing device and predict, in response to the lighting level satisfying a threshold level of illumination, that a user will have difficulty seeing user interface elements displayed on the display due to bright lighting conditions at the computing device; and
    a display control module to, in response to predicting that the user will have difficulty seeing the user interface elements, change a display theme for the user interface elements from a current display theme to a visually improved display theme that has a high brightness setting or uses color pairs that are opposite hues, and audibly play back, via the speaker, a readout of the user interface elements displayed on the display including automatically repeating the readout at regular intervals.

17. The system as recited in claim 16, wherein the display control module is further to, in response to predicting that the user will have difficulty seeing the user interface elements cause, at each of one or more additional devices connected to the computing device, the readout of the user elements displayed on the display to be audibly played back at the additional device.

18. The system as recited in claim 17, wherein the display control module is further to communicate, in response to predicting that the user will have difficulty seeing the user interface elements, the readout of the user interface elements to each of the one or more additional devices.

19. The system as recited in claim 17, the one or more additional devices comprising multiple additional devices, and wherein to cause the readout of the user elements displayed on the display to be audibly played back at the additional device is to cause the readout of the user elements displayed on the display to be audibly played back sequentially at the multiple additional devices after the readout is audibly played back via the speaker.

20. The system as recited in claim 16, wherein the display control module is further to, in response to predicting that the user will have difficulty seeing the user interface elements cause, at a first additional device of multiple additional devices connected to the computing device, the readout of the user interface elements displayed on the display to be audibly played back at the first additional device after the readout is audibly played back via the speaker of the computing device and after audible playback of the readout by a second additional device of the multiple additional devices has completed.

* * * * *